United States Patent
Calhau Gonçalves et al.

(10) Patent No.: US 11,894,672 B2
(45) Date of Patent: Feb. 6, 2024

(54) WIND TURBINE GENERATOR FAULT PROTECTION SYSTEM

(71) Applicant: VESTAS WIND SYSTEMS A/S, Aarhus N (DK)

(72) Inventors: Luis Miguel Calhau Gonçalves, Aarhus C (DK); Kenneth G. Hansen, Kjellerup (DK); Hans Christian Bisgaard-Clausen, Holstebro (DK); Duy Duc Doan, Tilst (DK); Hamid Soltani, Silkeborg (DK); Poul Møhl Dyrlund, Lystrup (DK); Kent Tange, Ry (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 18/004,879

(22) PCT Filed: Jul. 6, 2021

(86) PCT No.: PCT/DK2021/050225
§ 371 (c)(1),
(2) Date: Jan. 9, 2023

(87) PCT Pub. No.: WO2022/008017
PCT Pub. Date: Jan. 13, 2022

(65) Prior Publication Data
US 2023/0231375 A1   Jul. 20, 2023

(30) Foreign Application Priority Data
Jul. 10, 2020   (DK) .......................... PA 2020 70473

(51) Int. Cl.
*H02H 7/06* (2006.01)
*H02H 3/00* (2006.01)
(Continued)

(52) U.S. Cl.
CPC .............. *H02H 7/06* (2013.01); *H02H 3/006* (2013.01); *H02J 3/381* (2013.01); *H02P 9/006* (2013.01); *H02P 2101/15* (2015.01)

(58) Field of Classification Search
CPC .......... H02H 3/006; H02H 3/02; H02H 3/021; H02H 3/023; H02H 3/025; H02J 3/381; H02P 9/006; H02P 210/15
See application file for complete search history.

(56) References Cited

U.S. PATENT DOCUMENTS

2006/0214428 A1   9/2006  Altemark et al.
2011/0140424 A1   6/2011  Edenfeld
(Continued)

FOREIGN PATENT DOCUMENTS

| EP | 2141788 A2 | 1/2010 |
|---|---|---|
| WO | 2012000508 A2 | 1/2012 |
| WO | 2013013678 A2 | 1/2013 |

OTHER PUBLICATIONS

International Search Report and Written Opinion for PCT Application No. PCT/DK2021/050225, dated Sep. 24, 2021.
(Continued)

*Primary Examiner* — Nguyen Tran
(74) *Attorney, Agent, or Firm* — Patterson + Sheridan, LLP

(57) ABSTRACT

A system for a wind turbine that includes a protection system interfaced to a circuit breaker system and a sensing system. The protection system is configured to determine an operational mode of the wind turbine by monitoring at least two parameters determine a parameter set comprising a plurality of operational parameters based on a determined operational mode, and an associated set of expected values corresponding to the parameter set, determine actual values corresponding to the determined parameter set, identify a fault condition in the event that the determined set of actual values of
(Continued)

the operational parameters do not correspond to the determined set of expected values of the operational parameters, and implement a protection action based on the identified fault condition.

16 Claims, 6 Drawing Sheets

(51) Int. Cl.
*H02J 3/38* (2006.01)
*H02P 9/00* (2006.01)
*H02P 101/15* (2016.01)

(56) References Cited

U.S. PATENT DOCUMENTS

| | | | |
|---|---|---|---|
| 2013/0054043 A1* | 2/2013 | Klodowski | G01R 31/343 713/320 |
| 2013/0214535 A1 | 8/2013 | Brath | |
| 2014/0306583 A1 | 10/2014 | Moller | |
| 2018/0335017 A1* | 11/2018 | Nielsen | F03D 7/026 |

OTHER PUBLICATIONS

Danish Patent Office, Search Opinion for Danish Patent Application No. PA 2020 704703, dated Jan. 21, 2021.
Danish Patent Office, Search Report for Danish Patent Application No. PA 2020 704703, dated Jan. 21, 2021.

* cited by examiner

WIND TURBINE GENERATOR FAULT PROTECTION SYSTEM

TECHNICAL FIELD

The invention relates to a fault protection system for a wind turbine power generation system.

BACKGROUND

Utility-scale wind turbines are complex electro-mechanical machines incorporating power generating equipment. In a so-called 'full-scale' converter architecture, the power generating system includes a generator system driven by a bladed rotor and which outputs alternating current to a "machine-side section" of a power converter which supplies direct current to a DC-link. In turn, a "line-side section" or "grid-side section" of the power converter connected to the DC-link generates AC power at a selected voltage and frequency which is output to the output terminals of the wind turbine from where it is transmitted to a power distribution grid.

In steady state operation, the electrical generator supplies the machine-side section with electrical energy whilst the grid-side converter functions to push that energy in the form of controllable AC power onto the distribution grid. However, there are instances where the operation of the converter system is required to stop. An example of this is when there is a fault with the distribution grid and the wind turbine is required to be disconnected from it. Another example is when there is an internal fault within the generator system, or the cables connecting the generator system to the power converter, such that it would be hazardous to maintain the generator system in an operational state. One available option is to control the pitch of the blades and a braking system to slow the rotation of the electrical generator to an eventual stop thereby halting the generation of power. However, this is a time-consuming process and may take up to a few minutes due to the inertia built up in the system. Other approaches involve opening circuit breakers within the power generation system in order to protect certain areas from over voltages and currents. Key to this is an in-built function to detect when there is an internal fault. In known systems, for example as disclosed in US2014/0306583, typically the approach relies on a sensor system monitoring for hazardous current levels within the electrical generator or the associated converters upon which detection selected circuit breakers can be triggered to open selected circuits for protective purposes. Although such an approach is adequate in many circumstances, its usefulness is limited particularly where fault conditions may not be identified by sharp increases in current or situations where circuit breakers do not protect the power path. For example, in some permanent magnet generators, fault currents may be only slightly higher than nominal current levels which means that existing protection system may not be able to detect a fault reliably. It is against this background that the invention has been devised.

It is against this background that the invention has been devised.

SUMMARY OF THE INVENTION

According to a first aspect of the invention, there is provided a system for a wind turbine, comprising a generator connected to a power converter by an electrical connection, a circuit breaker system controlling the connection between the generator and the power converter through the electrical connection, and a sensor system configured to sense operational parameters, wherein the generator is a permanent magnet generator. The system further comprises a protection system interfaced to the circuit breaker system and the sensing system. The protection system is configured to:

determine an operational mode of the wind turbine by monitoring at least two parameters of: the speed of the generator, the operational status of the power converter, and the operational status of the circuit breaker system, and defining an operational mode based on the monitored parameters, determine a parameter set comprising a plurality of operational parameters based on the determined operational mode, and an associated set of expected values corresponding to the parameter set, wherein the determined parameter set includes generator voltage and generator speed, determine actual values corresponding to the determined parameter set, identify a fault condition in the event that the determined set of actual values of the operational parameters do not correspond to the determined set of expected values of the operational parameters, and implement a protection action based on the identified fault condition.

The invention also extends to a method of providing fault protection for a power generation system of a wind turbine, wherein the power generation system comprises a generator connected to a power converter by an electrical connection, a circuit breaker system controlling the connection between the generator and the power converter through the electrical connection, and a sensor system configured to sense operational parameters, wherein the generator is a permanent magnet generator. The method comprises the following steps:

determine an operational mode of the wind turbine by monitoring at least two parameters of: the speed of the generator, the operational status of the power converter, and the operational status of the circuit breaker system, and defining an operational mode based on the monitored parameters, determine a parameter set comprising a plurality of operational parameters based on the determined operational mode, and an associated set of expected values corresponding to the parameter set, wherein the determined parameter set includes generator voltage and generator speed, determine actual values corresponding to the determined parameter set, identify a fault condition in the event that the determined set of actual values of the operational parameters do not correspond to the determined set of expected values of the operational parameters, and implement a protection action based on the identified fault condition.

The invention can also be expressed as a processor or controller component that is configured to be part of a power generation system of a wind turbine as defined above. The process/controller is configured with a suitable processing environment, hardware support components and memory to execute the method steps as defined above.

The operational mode may include at least one or more of the following: generator idle mode; generator nominal mode; generator paused mode. Advantageously, therefore, the system is able to discriminate its applicable fault actions in response to a fault based on which operational mode the power generation system is in.

The parameter set comprises one or more voltage parameters and one or more current parameters. The parameter set may also include generator speed.

The system of any preceding claim, wherein the sensor system comprises at least one current sensor integrated into the power converter. Advantageously, this means that the system does not require additional power converters integrated in the cables/bus bars connecting between the generator and the power converter. Moreover, the at least one current sensor may be integrated into a machine side converter of the power converter and may be integrated into each phase of the machine side converter. Such a configuration provides precise localisation of sensing at the machine-side converter in order to protect that component from faults.

The circuit breaker system may include at least one circuit breaker integrated into the power converter. Advantageously, this means that the need for additional circuit breakers located on the cables/busbars between the terminals of the converter and the generator can be avoided. Notably, the at least one circuit breaker may be of the type which does not include an integrated current detector. Therefore, the circuit breakers are controlled by way of the methodology discussed above rather than a conventional approach in which the circuit breaker responds only to an excessive current flowing through the conductor in which the circuit is integrated.

Aspects of the invention also relate to a computer program product comprising instructions which, when executed by a suitable computer, causes the computer to carry out the method as described above, and a computer-readable storage medium comprising the computer program product as defined above.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

The above and other aspects of the invention will now be described, by way of example only, with reference to the accompanying drawings, in which.

Note that features that are the same or similar in different drawings are denoted by like reference signs.

SPECIFIC DESCRIPTION

A specific embodiment of the invention will now be described in which numerous features will be discussed in detail to provide a thorough understanding of the inventive concept as defined in the claims. However, it will be apparent to the skilled person that the invention may be put into effect without the specific details and that in some instances, well known methods, techniques and structures have not been described in detail in order not to obscure the invention unnecessarily.

Figure 1:
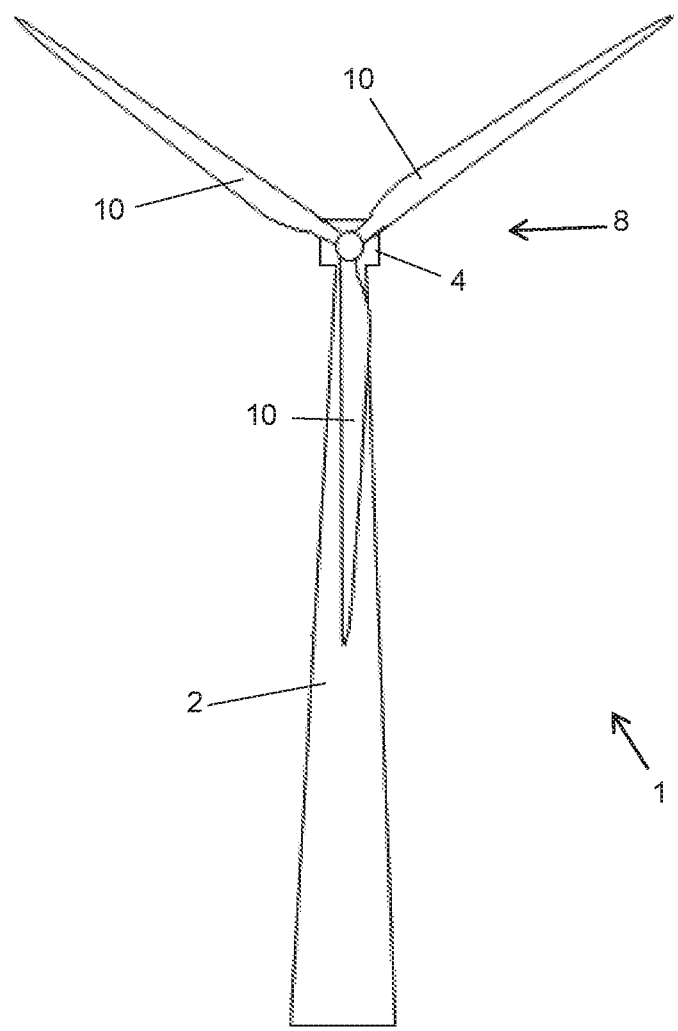
FIG. 1 is a front view of a wind turbine, in which examples of the invention may be implemented.

In order to place the examples of the invention in a suitable context, reference will firstly be made to FIG. 1, which illustrates a typical Horizontal Axis Wind Turbine 1 (HAWT) comprising a tower 2, a nacelle 4 rotatably coupled to the top of the tower 2, a rotating hub or 'rotor' 8 mounted to the nacelle 4 and a plurality of wind turbine rotor blades 10 coupled to the rotor 8.

The nacelle 4 houses and supports various components that comprise a power generation system (not shown in FIG. 1) of the wind turbine 1, as will be described with reference to FIG. 2. As is known, a flow of wind acting on the blades 10 spins the rotor 8, which drives the power generation system housed in the nacelle 4.

The wind turbine generator 1 illustrated in FIG. 1 may be an onshore or an offshore wind turbine, and it should be appreciated that it is shown here as an example of a system in which the invention may be implemented. The invention is also applicable to wind turbines having different numbers of blades, and also to vertical axis wind turbines.

Figure 2:
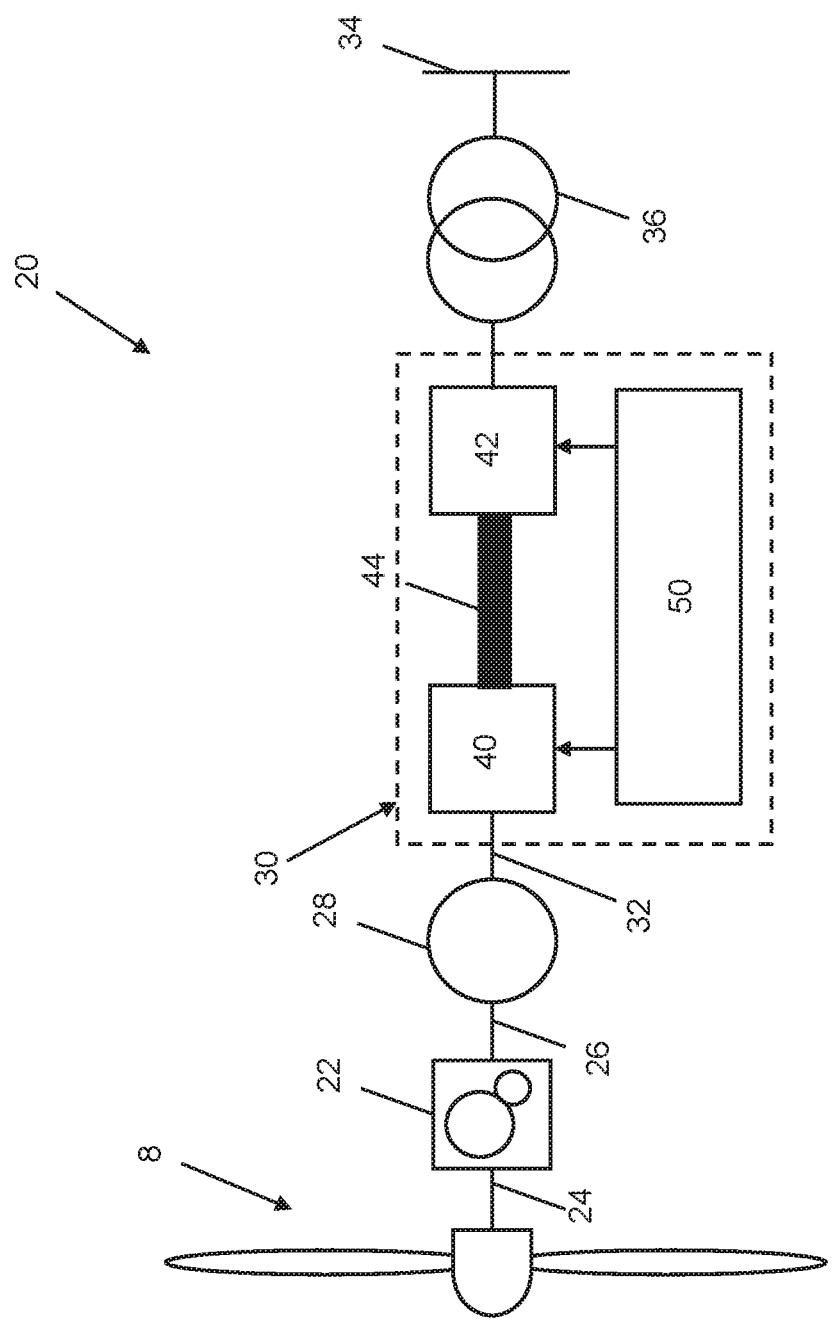
FIG. 2 is a schematic view of a power generation system of the wind turbine.

FIG. 2 is a schematic illustration of the main components that make up an example of a power generation system 20 to which this invention applies. In this system, the rotor 8 drives a transmission 22 by way of an input drive shaft 24. Although the transmission 22 is shown here in the form of a gearbox, it is also known for wind turbines to have direct-drive architectures which do not include a gearbox. The transmission 22 has an output shaft 26 which drives an electrical generator 28 for generating electrical power. Three-phase power generation is typical high-power applications. In this way, the rotor 8 drives the generator 28 through the transmission 22. It is increasingly common for wind turbine systems to use permanent magnet generators, as would be well understood by persons skilled in the art.

The generator 28 is connected to a power converter system 30 by a suitable three-phase electrical connector 32 such as a cable or busbar. The power converter system 30 converts the output frequency of the generator 28 to a frequency that is suitable for supplying to an electrical grid 34. The output of the power converter 30 is transmitted to the grid 34 through a transformer 36.

In this example, the power converter system 30 is an example of a 'full scale' power converter architecture in which the entire power output from the generator 28 is processed by the converter system 30. A similar architecture would also be found in a so-called doubly-fed induction generator (DFIG) system in which a portion of the generated electrical power is frequency-converted by a power converter and a portion of the electrical power is fed directly to the grid via a suitable transformer. Such architectures are well known to skilled persons.

Returning to FIG. 2, the power converter 30 includes a generator-side (or 'machine-side') converter section 40, and a line-side (or 'grid-side') converter section 42, which are coupled by a DC link 44. At this point it should be noted that FIG. 2 is a simplified view and so some components of a practical system such as chokes, smoothing capacitors and so on have been omitted for brevity and clarity.

The power converter system 30 also comprises a control system 50, which controls the operation of both the generator-side converter section 40 and the grid-side converter section 42 for efficient power conversion. In FIG. 2, the control system 50 is housed within a cabinet of the converter system and is connected to the generator-side converter section 40, and the grid-side converter section 42. The control system 50 is provided or is interfaced with a suitable sensing system (not shown in FIG. 2) so that it can monitor the voltages, currents and associated frequencies in the system and control the two converter sections accordingly. In use, the control system 50 is responsible for operating the converter sections using an appropriate pulse-width modulated (PWM) drive signal that is configured to achieved the required power conversion and to interface with a turbine controller. Such PWM drive signals are well understood by the skilled person.

Operation of the power converter system 30 in this example of the invention is conventional, although there now follows a summary of its operation for completeness. Considering the generator-side converter section 40 in more detail, three-phase AC power received by the generator-side converter section 40 from the generator 28 is converted into a direct current (DC) signal. As already noted, this is necessary as the power produced in the generator 28 is not in a form suitable for delivery to the grid 34. This is typically because the power is not at the correct frequency or phase angle as these values are determined, at least in part, by the speed of rotation of the rotor 8, which in turn is dependent on wind conditions.

The conversion is performed to supply a DC voltage to the grid-side converter section 42 for re-conversion to an AC voltage having a form suitable for supply to the grid 34. In general terms, therefore, the power converter system 30 provides AC to AC conversion, which it achieves by feeding electrical current through an AC-DC converter 40 followed by a DC-AC converter 42 arranged in series.

Figure 3:
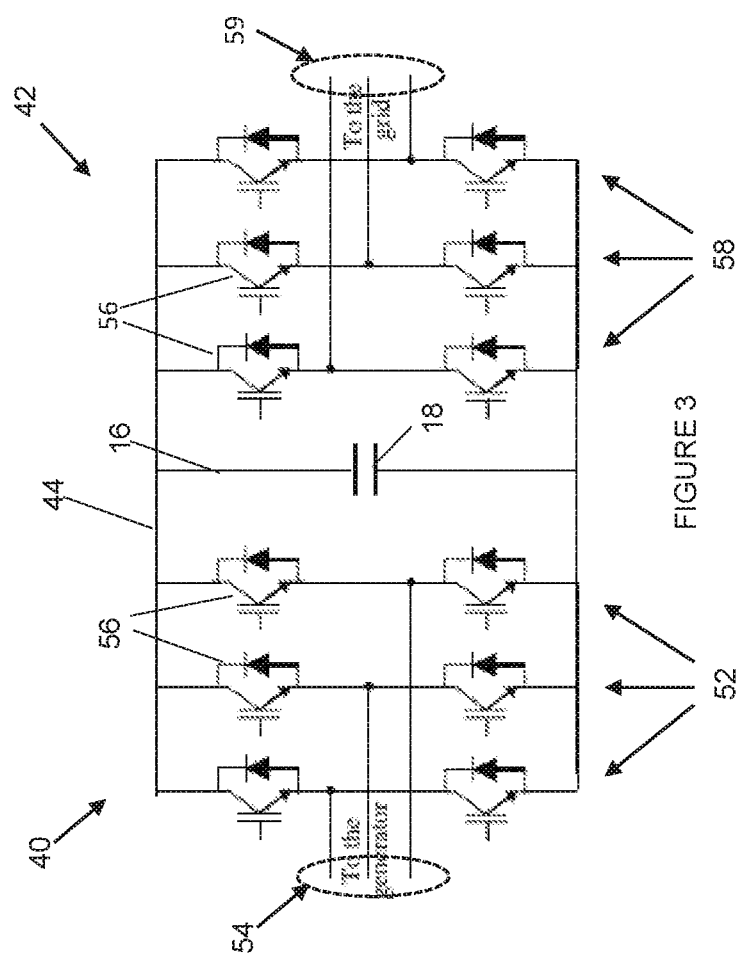
FIG. 3 is a more detailed view of a converter system that may be used in the power generation system of FIG. 2.

Each of the generator-side and grid-side converter sections 40,42 are implemented as a bridge network of semiconductor switching devices, as shown in FIG. 3, to convert the AC or DC signals as required. Typically, this is achieved by switching the devices between 'on' and 'off' states at high frequency and at a particular duty cycle to produce an intended output. For example, using a duty cycle of 50% produces an output voltage from the switching device that is half of its maximum output voltage when in the 'on' state. Suitable switching devices for this purpose include integrated gate bipolar transistors (IGBTs) or metal-oxide-semiconductor field-effect transistors (MOSFETs).

Each of the converter sections may be a modular, multi-level converter (MMC), a two-level or three-level back-to-back converter or another converter configuration/topology that contains switching devices. FIG. 3 illustrates an example of a two-level converter architecture that is suitable for this purpose. A skilled person would appreciate that the bridge arrangements of switching devices as shown in FIG. 3 could be replicated to increase the voltage supply of the three-phase system. This arrangement will be familiar to the skilled reader, and so is only described in overview here to establish context for embodiments of the invention.

In the arrangement shown, each phase of the three-phase power supplied by the generator 28 connects to a respective leg 52 of the generator-side converter section 40 at a converter input 54. Each leg 52,58 includes two switching devices 56 in series (not all of which are labelled, for clarity), each of which is paired with a respective parallel diode. The three legs 52 together form the generator-side converter section 40, and are connected to the DC link 44 in parallel with one another. Three further legs 58 are disposed beyond the DC link 44, each of which connects to a respective phase of a converter output 59 to form the grid-side converter section 42. The legs 58 of the grid-side converter section 42 are connected in parallel with one another and in parallel with the DC link 44 and the legs 52 of the generator-side converter section 40.

Each switching device 56 can be switched between on and off states as described above, and the switching devices 56 of each leg 52, 58 are controlled in tandem by the controller 50, so that a common PWM drive signal is sent to each device 56 of the pair. It is noted that different PWM drive signals are sent to each leg 52, 58 to account for the difference between the phases. In each leg 52, 58 of the converter, either both switching devices 56 may be switched off so that no current flow is possible through that leg 52, 58 in either direction, or one of the switching devices 56 of the leg 52, 58 is on so that electrical power is channelled through the respective leg in one direction to the relevant output.

FIGS. 2 and 3 describe in overview the operation of the power converter system 20 with specific reference to an exemplary example of a suitable architecture. The invention will now be described in more detail with reference to FIGS. 4 to 6 which set out various aspects of structure and functionality of an example of the invention.

Figure 4:
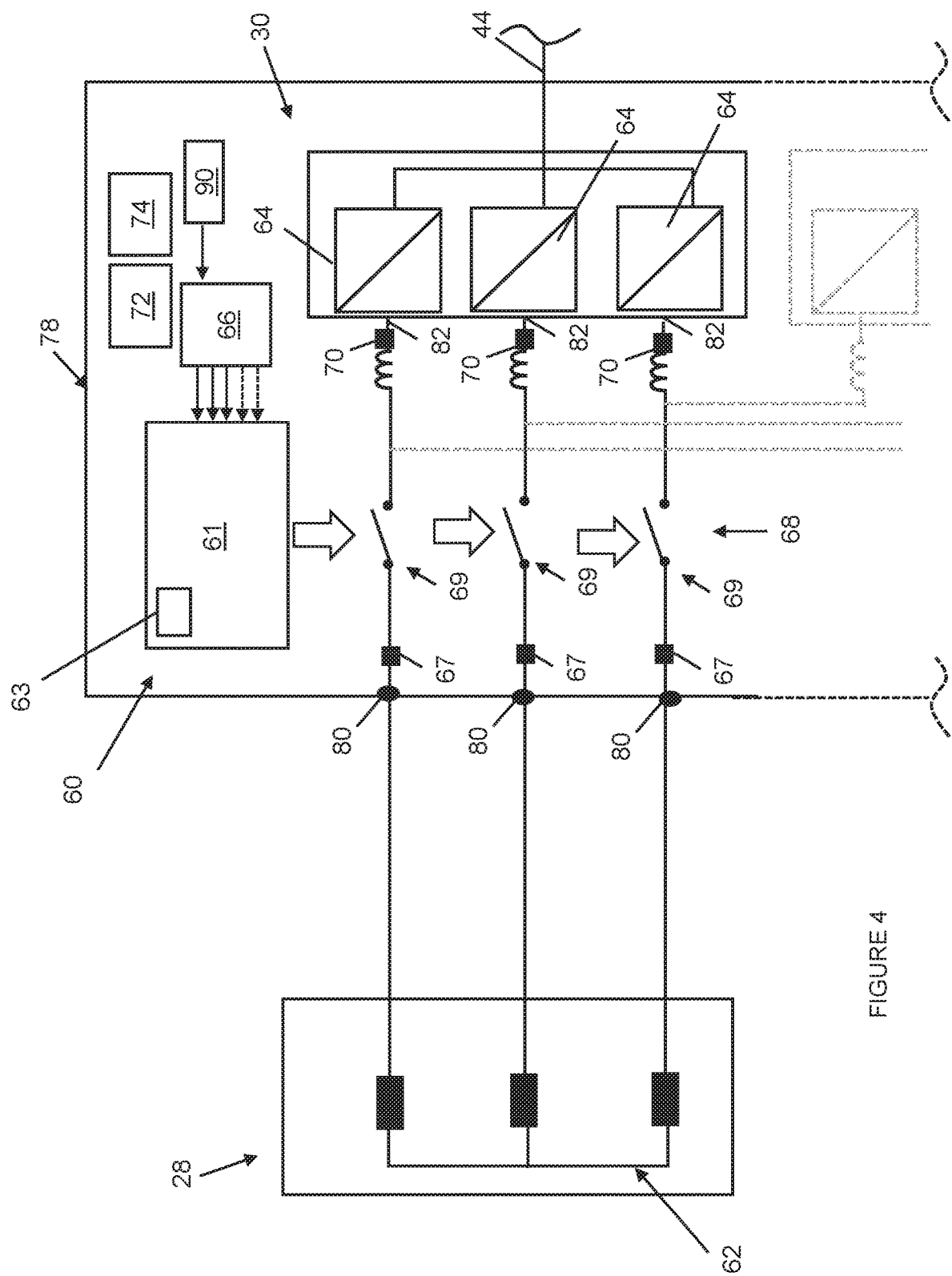
FIG. 4 is a schematic view of a machine side converter section of the power generation system in connection with a generator of the power generation system.

Referring firstly to FIG. 4, there is shown a detailed view of part of the power generation system, specifically the generator-side converter section 40 which is connected to the generator 28 by the electrical connection 32 which, as is mentioned above, may be a set of cables or a rigid busbar.

The power generation system 20 in this example of the invention is equipped with a protection system 60 including a processing module 61 having an associated memory 63. The processing module 61 is shown as a single unit or module in FIG. 4 for convenience, but it should be appreciated that the protection functionality implemented by the processing module 61, as will be discussed, may be implemented by across more than one processing module. Furthermore, although the functionality of the processing module 61 is shown as being implemented in a dedicated component, it should be appreciated that this is not essential and as such the protection functionality may well be included in a primary control unit of the wind turbine. As such, the protection system, as described here, merely indicates a piece of suitable functionality that is implemented in a suitable processing environment within the wind turbine.

In FIG. 4 the generator 28 is shown as a single set of field windings 62 that is connected a respective converter stack 64 of the machine-side converter section 40. Note that this representation is for the sake of brevity and in a practical implementation the generator may include two or more sets of field windings each set of field windings feeding a respective further converter stack. Furthermore, as shown here, the set of field windings 62 feeds a single converter stack 64, although it should also be appreciated that the same set of windings 62 could be configured to supply a further converter stack in order to increase the DC voltage supplied to the DC link 44.

In order to gather the required data from the power generation system 20, the processing module 61 is interfaced to a sensing system 66, and in order to carry out suitable protective functions, the processing module 61 is interfaced to a circuit breaker system 68.

The sensing system 66 comprises a plurality of different sensors. In overview, those sensors comprise voltage sensors 67, current sensors 70, a smoke detector or sensor 72 and an arc flash sensor or detector 74. As illustrated, the sensor system 66 is shown as a single block, but it should be appreciated that the actual sensing elements are distributed throughout the power generation system 20.

The circuit breaker system 68 comprises a series of circuit breakers 69 that are implemented on the incoming electrical connection 32 from the generator 28. The circuit breakers 69 of the circuit breaker system 68 may be connected into the cables or bus extending between the terminals of the generator 28 and a cabinet 78 within which the converter system 30 is housed. Note here that cabinet terminals are identified as '80'. Alternatively, and as shown in the illustrated figure, the circuit breakers 69 may be included inside the converter cabinet 78, meaning that the circuit breakers 69 are located between the cabinet terminals 80 and the respective terminals 82 of the converter stacks 64. Expressed another way, therefore, the circuit breakers 69 are integrated into the power converters, and specifically the generator-side converter section 40 in this example. Advantageously, this avoids the need to provide additional circuit breaker hardware between the generator and the converter. Notably, the circuit breakers 69 are of the type which do not include current sensing functionality in the form of a current detector/a protection trip unit therefore they do not operate autonomously. Instead, the operation of the circuit breakers 69 is governed by the functionality of the protection system 60.

It will be appreciated from FIG. 4 that the current sensors 70 are also integrated into the power converter and, more specifically, the generator-side converter section 40. As shown, the current sensors 70 shown as being located at input terminals 82 of the respective converter stacks 64, but in practice are current sensors that are integrated into the stacks, as would be understood by the skilled person. This ensures that an accurate measurement of the phase current at the converter stacks 64 is provided to the protection system 60. Conveniently, using circuit breakers and current sensors that are installed inside the converter cabinets allows improved control over the temperature and humidity to which those components are exposed, since the converter cabinet is climate controlled. It is also more cost effective and limits exposure to vibrations from the generator.

In order for the protection system 60 to process data relating to the broader operation of the wind turbine. It may also interfaced to a wind turbine control system, shown here as '90'. However, the protection system may also directly measure such parameters.

The sensing system 66 is shown in this example as a distributed set of sensors which the protection system 60 uses to monitor various operational parameters of the power generation system. In this way, the protection system 60 can perform a more optimised diagnostic and response routine for the converter.

This is important in the context of a generator which is a permanent magnet generator. As would be known to a skilled person, a permanent magnet generator includes a rotor comprising a set of permanent magnets. The stator comprises a set of phase windings which are energised by the permanent magnets in the rotor when it rotates. Unlike other generator architectures, for example induction generators, current is always induced in the phase windings whenever the generator rotor is rotated by the blades of the wind turbine, even at low rotational speeds. It is therefore important to be able to discriminate between different fault conditions and take appropriate action. Furthermore, a characteristic of permanent magnet generators is that they tend to have low short circuit ratios, meaning that short circuit currents within the generator may only be slightly higher than nominal currents. This means that short circuits can be challenging to detect with existing circuit breaker technology which rely simply on detecting currents that exceed predetermined thresholds. The protection system 60 of the invention does not suffer from the same drawbacks and so is adept at identifying and responding to faults within a power generation system including a permanent magnet generator.

Figure 5:
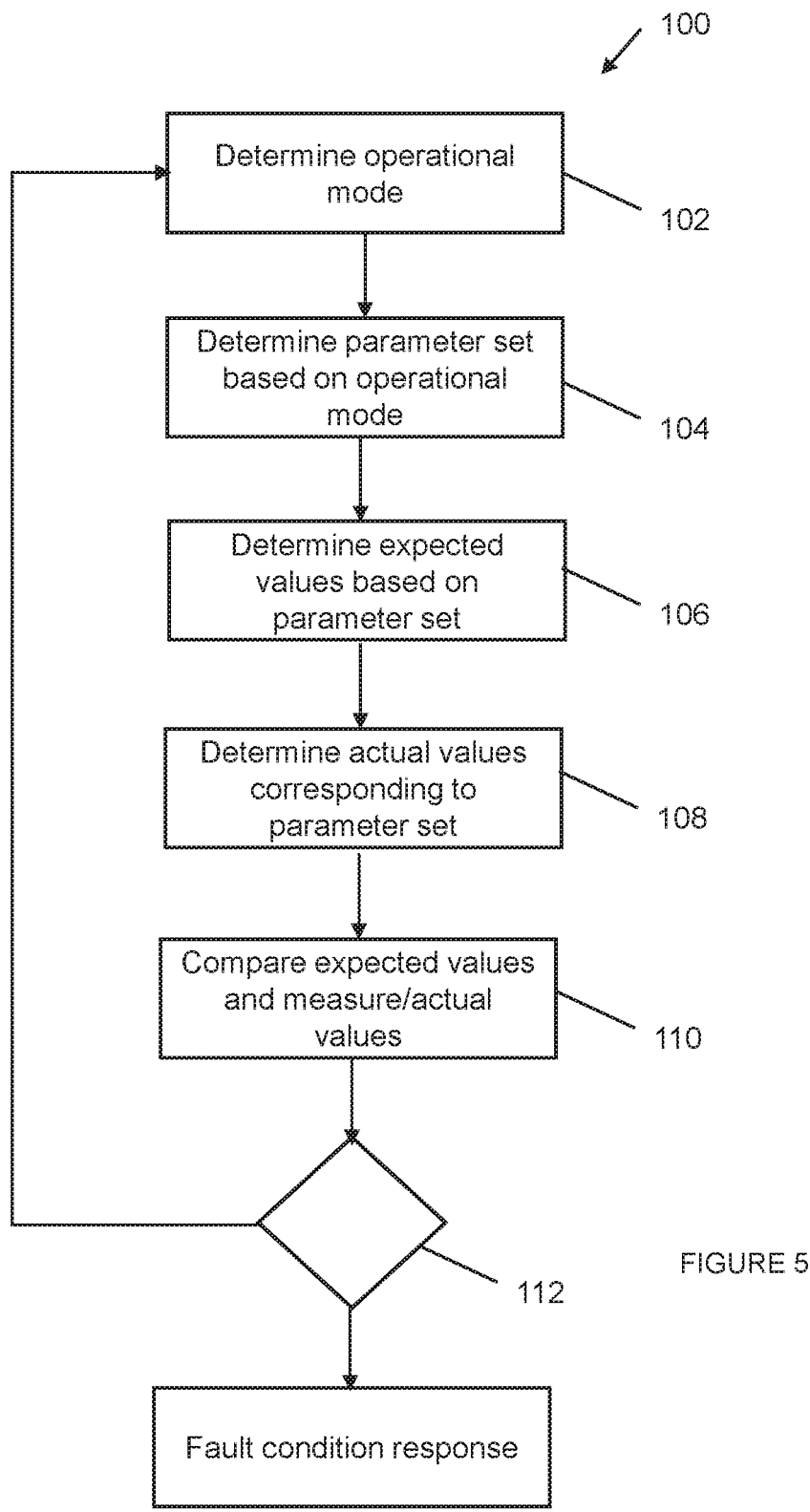
FIG. 5 is a flow chart illustrating an example of how the invention may be implemented.

FIG. 5 provides an example of the process, algorithm or routine 100 that is implemented by the protection system 60. In a first step 102, the process determines an operational mode of the power generation system 20. This is achieved by monitoring operational parameters of the wind turbine in order to respond with an appropriate protection action. In this example, the operational mode is determined by monitoring at least two parameters out of the following: the speed of the generator, the operational status of the power converter, and the operational status of the circuit breaker system. As has been discussed above, the processing module 61 is interfaced to the sensing system 66 and so is able to receive data relating to generator speed from the main control system 90 of the wind turbine. Alternatively, the processing module 61 may be configured to receive a direct input of generator speed data from an appropriate sensor (e.g. an appropriately mounted Hall sensor or encoder) or it may derive generator speed data based on other signals. Possibly, for example, generator speed may be determined based on suitable processing of the voltage signal.

Based on the monitored operational parameters, one of several operational modes can be defined. By way of example, consider the three following scenarios:

Nominal operation mode or 'Nominal Mode'. In this mode, the generator 28 is considered to be operating within acceptable limits, which may be denoted by the generator speed being above a predetermined threshold, the circuit breaker system 68 being closed, (i.e. the conductive state) and the converter operating normally, that is the machine side converter section 40 is being driven with a suitable PWM driving signal.

Idle operational mode or 'Idle Mode'. This mode is suitable for when the wind turbine is required to be shut down for maintenance or due to a high wind condition, or when the wind speed is not high enough to initiate power production. In such circumstances, the generator 28 may still be turning, but the converter system 30 is in a disabled state. Therefore, Idle Mode may be denoted by the generator having a speed below a predetermined threshold (e.g. equivalent to cut-in speed), the the circuit breaker system 68 being open (i.e. in the non-conductive state) and the converter being disabled (i.e. the converter controller 50 has disabled the PWM driving signal to the machine side converter section 40).

Motoring operational mode or 'Motor Mode'. Motor Mode is applicable to a situation when power is consumed from the grid or another power source in order to operate the generator as a motor so as to turn the rotor. This mode may be used during turbine assembly to facilitate assembly of the blades onto the rotor. In the Motor Mode, therefore, the direction of the current flow is inverted by the converter system 30 in order to operate the generator as a motor. Therefore, this mode may be characterised by the system identifying that the generator is turning, the switches 69 of the breaker system 68 being closed, therefore conducting, and the generator-side converter section 40 being disabled such that it is not being supplied with a suitable PWM driving signal.

It will be appreciated that in each of the three operational scenarios discussed above, a different analytical approach to identify faults in the system may be required. Therefore, the processing module 61 is configured to determine a predetermined set of parameters for analysis based on which of the operational modes is identified. This is indicated at process step 104 on FIG. 5.

Figure 6:
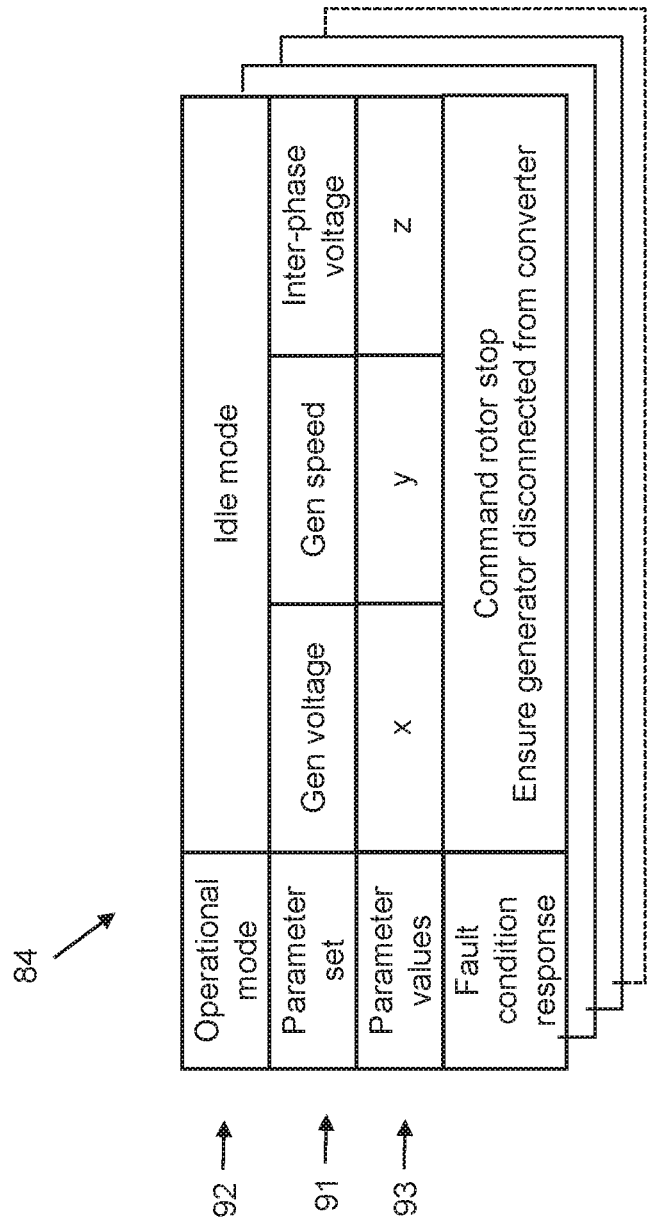
FIG. 6 is an example of a data structure illustrating operational conditions and associated parameter sets.

An example for how this is carried out is illustrated in FIG. 6. The processing module 61 may store a suitable data structure 84 in its memory 63 which associates a suitable parameter set 91 with each of the determined operational modes 92. As can be seen in FIG. 6, therefore, the operational mode 92 is 'Idle Mode' and the parameter set 91 includes i) generator voltage, ii) generator speed and iii) interphase voltage. It should be appreciated at this point that the specific parameters listed in this parameter set are merely examples and, as such, the parameter set may include more parameters. Furthermore, the individual parameters may represent comparative functions rather than discrete parameters. Note that the specific structure shown in FIG. 6 is for illustrative purposes only to show the type of information that may be provided and it does not necessarily represent the exact representation of a suitable data structure that may be implemented in a practical embodiment, as would be understood by a skilled person.

For each of the parameters in the parameter set 91 the data structure 84 lists respective values 93 for those parameters. Therefore, the data structure 84 sets out the parameter values 93 that are expected for each parameter in the parameter set 91 for the respective operational mode 93. Following identification of the operation mode, therefore, the processor module 61 is able to access the parameter set 93 listed in the data structure 84 and determine which values for those parameters are considered to be 'expected' values for that operational mode. This is indicated at step 106 in FIG. 5.

One the processing module 61 has identified the expected parameter values 93, it then is operable to obtain data relating to the measured or actual values corresponding to the parameters identified by the parameter set 91 by querying the incoming sensor data from the sensing system 66. This is identified at step 108 in FIG. 5.

Once the parameter values have been determined at step 106, and the actual values have been determined/measured at step 108, the method involves comparing the actual values with the expected values, as indicated at step 110 and 112.

If the measured values match or are sufficiently the same as the expected values, subject to appropriate factors such as measurement tolerance, deadbands and hysteresis, then the process 100 loops back to step 102 to re-check the current operational mode. It is envisaged that a suitable processing frequency for the process would be in the order of 1-100 Hz, although that is merely indicative and other process speeds would be acceptable.

If the measured values do not match the expected values, then the system proceeds to identify that a fault condition is present and so triggers a fault condition response. The fault response may be standard across all of the operational modes. Alternatively, the fault condition response may be specific to the operational mode that has been identified. One option therefore, as is shown in FIG. 6, is that the data structure 84 may also include a fault condition response field which dictates the appropriate response to be taken by the processing module 61 in the event that a fault condition is identified. It should be noted that a single fault condition response may be identified as is shown in this example, or a more complex fault response regime may be specified in which multiple responses may be identified, which may be triggered selectively.

In the illustrated example in FIG. 6, the operational mode is Idle Mode, and the parameter set 91 includes generator voltage, generator speed and interphase voltage. As will be appreciated from FIG. 6, the respective parameter values are undefined here, but the values would be determined through suitable modelling processes to identify appropriate levels for the parameters. Based on the identified Idle Mode of operation, the protection system would therefore monitor the sensed parameters of generator voltage, generator speed and the interphase voltage in order to identify faults within the system. By way of example, if it is determined that the measured generated voltage does not match what is expected for the measured voltage, then it can be deduced that there is a fault present. In this example, the parameter 'gen speed' may define a lower speed threshold and the parameter 'gen voltage' may define a lower voltage threshold. So, as long as the measured voltage is above the expected value, and the measured generated speed is above the expected value, then it can be said that no fault is present.

In Idle Mode, the protection system 60 also monitors the inter-phase voltage parameter to compare this against the expected value in the parameter set. The parameter 'interphase voltage' may be a single value that is the same between phases A-B, B-C or C-A of the generator, or there may be separate interphase voltage values for each of the phase pairs. Irrespective of this, the protection system 60 is operable to compare the measured voltage differences between the phases of the generator with the inter-phase voltage value as defined by the parameter set. If the voltage different between one or more phases differs, then the protection system is operable to determine that a fault is present and appropriate action can be taken.

In the Idle Mode, in the event that a fault is detected the appropriate fault response can be taken. In this case, the appropriate fault action may be that the protection system 60 transmits an instruction to the wind turbine control system (not shown) or sets an appropriate software flag that indicates that the mechanical rotation of the generator should be stopped as fast as possible. This initiates a rotor stop event where the blades of the rotor are features into the maximum pitch position to minimise aerodynamic lift at which point a rotor brake would be applied to halt rotation. The protection system 60 would also ensure that the breaker system is set such that all circuit breaker switches remain in the open position such that the generator is disconnected from the converter system 30.

Other operational modes are also included in the data structure, but are not shown explicitly in FIG. 6. However, for completeness, the following discussion is provided for the other operational modes.

Nominal Mode is characterised by the generator speed being above a predetermined threshold, the circuit breaker system 68 being closed, (i.e. the conductive state) and the converter operating normally, that is the machine side converter section 40 is being driven with a suitable PWM driving signal. The corresponding parameter set 91 may be defined by current thresholds for each phase of the generator, as measured by the current sensors 70 which may be positioned at the input terminals 82 of the generator-side converter section 40 or integrated into the converter stack electronics, and also inter-phase current thresholds between each phase of the generator 28. In this mode, if a fault is detected, the appropriate fault response may be to command the circuit breaker system 68 to open the individual circuit breaker switches 69. Moreover, the protection system 60 may also command the wind turbine control system to stop the rotor from rotating.

Motor mode may be characterised by similar conditions as the Nominal Mode, although the generator speed will be much lower, as would current and voltage levels in the phase windings of the generator. A suitable parameter set would be selectable for the Motor Mode. If a fault is detected during the Motor Mode the circuit breaker system could be configured to isolate the generator from the generator-side converter section.

The above scenarios provide examples of a conditional-based supervision of the generator system which achieves a more adaptable system for monitoring the operation of the generator system and taking appropriate action in the event that a fault is detected in the system. In addition to the Idle Mode, Nominal Mode and Motor Mode discussed above, other operational modes may be defined. The protection system 60 may therefore be configured to be re-programmed during use in order to expand the catalogue of fault conditions to which it is responsive. Single-parameter based fault conditions may also be included in the functionality of the protection system 60. For example, in this example it also receives sensor input from the smoke detector 72 and the arc flash detector 74. If either of these sensor inputs indicate a positive result, the protection system 60 is configured to trigger a fault event and carry out a suitable response action, for example commanding the circuit breaker system 68 to open and commanding the wind turbine control system 90 to halt the rotation of the rotor thereby stopping the generator 28.

Various examples of the invention have been discussed above, together with alternatives and variants thereon. The skilled person would also be aware that other modifications to the illustrated and described examples would be possible without departing from the inventive concept as defined by the claims.

The invention claimed is:

1. A system for a wind turbine, comprising:
   a generator connected to a power converter by an electrical connection, a circuit breaker system controlling the connection between the generator and the power converter through the electrical connection, and a sensor system configured to sense operational parameters, wherein the generator is a permanent magnet generator; and
   a protection system interfaced to the circuit breaker system and the sensing system, wherein the protection system is configured to:
      store a first data structure for a first operational mode and a second data structure for a second operational mode different from the first operational mode,
   wherein the first data structure comprises a first expected value for a generator voltage and a first expected value for a generator speed, and wherein the second data structure comprises a second expected values for the generator voltage and a second expected value for the generator speed;
      determine that the wind turbine is operating according to the first operational mode rather than the second operational mode by monitoring at least two parameters of: the generator speed, an operational status of the power converter, and an operational status of the circuit breaker system;
      select the first data structure rather than the second data structure in response to determining that the wind turbine is operating according to the first operational mode rather than the second operational mode;
      determine actual values for the generator voltage and the generator speed;
      identify a fault condition in the event that at least one of the actual values for the generator voltage or the generator speed do not correspond to at least one of the first expected value for the generator voltage or the first expected value for the generator speed in the selected first data structure; and
      implement a protection action based on the identified fault condition.

2. The system of claim 1, wherein the first operational mode includes at least one or more of the following: a generator idle mode, a generator nominal mode, and a generator motor mode.

3. The system of claim 1, wherein the sensor system comprises at least one current sensor integrated into the power converter.

4. The system of claim 3, wherein the at least one current sensor is integrated into a machine side converter of the power converter.

5. The system of claim 4, wherein at least one current sensor is integrated into each phase of the machine side converter.

6. The system of claim 1, wherein the circuit breaker system includes at least one circuit breaker integrated into the power converter.

7. The system of claim 6, wherein the at least one circuit breaker is integrated into a machine side converter of the power converter.

8. The system of claim 6, wherein the at least one circuit breaker does not include an integrated current detector.

9. The system of claim 1, wherein the sensor system comprises at least one voltage sensor integrated into the power converter.

10. The system of claim 9, wherein the sensor system comprises at least one current sensor integrated into the power converter, wherein the at least one current sensor is integrated into a machine side converter of the power converter, and wherein the at least one voltage sensor is integrated into the machine side converter of the power converter.

11. The system of claim 9, wherein the circuit breaker system includes at least one circuit breaker integrated into the power converter and wherein the at least one voltage sensor is positioned on a generator side of a respective one of the at least one circuit breakers.

12. A method of fault protection in a wind turbine power generation system comprising a generator connected to a power converter by an electrical connection, a circuit breaker system controlling the connection between the generator and the power converter through the electrical connection, and a sensor system configured to sense operational parameters, wherein the generator is a permanent magnet generator, wherein the method comprises:
   storing a first data structure for a first operational mode and a second data structure for a second operational mode different from the first operational mode, wherein the first data structure comprises a first expected value for a generator voltage and a first expected value for a generator speed, and wherein the second data structure comprises a second expected values for the generator voltage and a second expected value for the generator speed;

determining that the wind turbine is operating according to the first operational mode rather than the second operational mode by monitoring at least two parameters of: the generator speed, an operational status of the power converter, and an operational status of the circuit breaker system;

selecting the first data structure rather than the second data structure in response to determining that the wind turbine is operating according to the first operational mode rather than the second operational mode;

determining actual values for the generator voltage and the generator speed;

identifying a fault condition in the event that at least one of the actual values for the generator voltage or the generator speed do not correspond to at least one of the first expected value for the generator voltage or the first expected value for the generator speed in the selected first data structure; and implementing a protection action based on the identified fault condition.

13. A computer program product comprising a non-transitory computer readable medium storing instructions that, when executed by a computer, cause the computer to perform an operation of fault protection in a wind turbine power generation system, the operation comprising:

storing a first data structure for a first operational mode and a second data structure for a second operational mode different from the first operational mode, wherein the first data structure comprises a first expected value for a generator voltage and a first expected value for a generator speed, and wherein the second data structure comprises a second expected values for the generator voltage and a second expected value for the generator speed;

determining that the wind turbine is operating according to the first operational mode rather than the second operational mode by monitoring at least two parameters of: the generator speed, an operational status of the power converter, and an operational status of a circuit breaker system;

selecting the first data structure rather than the second data structure in response to determining that the wind turbine is operating according to the first operational mode rather than the second operational mode;

determining actual values for the generator voltage and the generator speed;

identifying a fault condition in the event that at least one of the actual values for the generator voltage or the generator speed do not correspond to at least one of the first expected value for the generator voltage or the first expected value for the generator speed in the selected first data structure; and implementing a protection action based on the identified fault condition.

14. The system of claim 7, wherein the sensor system comprises at least one voltage sensor integrated into the power converter and wherein the at least one voltage sensor is positioned on a generator side of a respective one of the at least one circuit breakers.

15. The system of claim 10 wherein the circuit breaker system includes at least one circuit breaker integrated into the power converter and wherein the at least one voltage sensor is positioned on a generator side of a respective one of the at least one circuit breakers.

16. The system of claim 7, wherein the sensor system comprises at least one current sensor integrated into the power converter and at least one voltage sensor integrated into the power converter, wherein the at least one current sensor is integrated into a machine side converter of the power converter, wherein the at least one voltage sensor is integrated into the machine side converter of the power converter, and wherein the at least one voltage sensor is positioned on a generator side of a respective one of the at least one circuit breaker.

* * * * *